United States Patent [19]
Kim

[11] Patent Number: 6,101,243
[45] Date of Patent: Aug. 8, 2000

[54] DOCUMENT TRANSMISSION METHOD UPON GENERATION OF AN ERROR DURING COMMUNICATION IN A FACSIMILE SYSTEM

[75] Inventor: Kyung-Taek Kim, Gumi, Rep. of Korea

[73] Assignee: Samsung Electronics Co., Ltd., Suwon, Rep. of Korea

[21] Appl. No.: 08/675,489

[22] Filed: Jul. 1, 1996

[30] Foreign Application Priority Data

Jun. 30, 1995 [KR] Rep. of Korea ..................... 95/18964

[51] Int. Cl.$^7$ .............................. H04N 11/00; H04N 1/00
[52] U.S. Cl. ................................ 379/100.05; 379/100.14; 358/437; 358/434
[58] Field of Search ...................... 379/100.01, 100.05, 379/100.06, 100.14, 100.03; 358/400, 405, 407, 434, 435, 436, 437, 438, 443, 468, 444, 404, 406

[56] References Cited

U.S. PATENT DOCUMENTS

| | | |
|---|---|---|
| 4,807,276 | 2/1989 | Okabe ................................ 379/93.08 |
| 5,018,022 | 5/1991 | Tatsumi . |
| 5,077,742 | 12/1991 | Tsumura et al. . |
| 5,119,210 | 6/1992 | Baba . |
| 5,172,246 | 12/1992 | Yoshida . |
| 5,335,085 | 8/1994 | Nakatsuma . |
| 5,438,427 | 8/1995 | Yohsida . |
| 5,684,606 | 11/1997 | Yoshida ................................ 358/437 |
| 5,896,204 | 4/1999 | Sato et al. ............................. 358/405 |

FOREIGN PATENT DOCUMENTS

| | | |
|---|---|---|
| 0265963A2 | 5/1988 | European Pat. Off. . |
| 0554872A1 | 8/1993 | European Pat. Off. . |
| 6-133141 | 5/1994 | Japan . |
| 2170075A | 7/1986 | United Kingdom . |
| 2233858 | 1/1991 | United Kingdom . |

*Primary Examiner*—Curtis A. Kuntz
*Assistant Examiner*—George Eng
*Attorney, Agent, or Firm*—Robert E. Bushnell, Esq.

[57] ABSTRACT

A method for transmitting a document when an error is generated during communication in a facsimile system, contemplates the steps of: determining whether the error is generated in a call setup phase during the communication performed in accordance with a predetermined protocol; automatically re-dialing a receiving subscriber's telephone number to transmit image data from the document, when the error is generated in the call setup phase; determining whether the error is generated during transmission of the image data from the document, when the error is not generated in the call setup phase; and automatically re-dialing the receiving subscriber's telephone number and beginning transmission at a next page of the document immediately following a page of the document that generated the error, when the error is generated during the transmission of the image data.

13 Claims, 2 Drawing Sheets

DOCUMENT TRANSMISSION METHOD UPON GENERATION OF AN ERROR DURING COMMUNICATION IN A FACSIMILE SYSTEM

CROSS-REFERENCE TO RELATED APPLICATIONS

This application makes reference to, incorporates the same herein, and claims all benefits accruing under 35 U.S.C. §119 arising from an application for Document Transmission Method Upon Generation of n Error During Communication In A Facsimile System earlier filed in the Korean Industrial Property Office on Jun. 30, 1995 and there duly assigned Serial No. 18964/1995.

BACKGROUND OF THE INVENTION

The present invention relates to a facsimile system, and more particularly, to a method for transmitting pages of a document upon generation of an error during communication in a facsimile system.

In a conventional facsimile system, when a user dials a receiving subscriber's telephone number after inserting pages of a document to be transmitted into a document feeding cassette, the document pages are transmitted according to a predetermined protocol. When calling the receiving subscriber's facsimile system, the transmitting subscriber's facsimile system transmits a calling tone (hereinafter, "CNG") signal to the receiving subscriber's facsimile system. In response to the CNG signal, the receiving subscriber's facsimile system transmits a called station identification (hereinafter, "CED") signal, and subsequently transmits a non-standard facilities (hereinafter, "NSF") signal, a called subscriber identification (hereinafter, "CSI") signal and a digital identification (hereinafter, "DIS") signal. At this time, the transmitting subscriber's facsimile system analyzes the NSF signal to thereby determine whether or not an image quality change is requested. If an image quality change is requested, the transmitting subscriber's facsimile system changes the image quality mode according to the image quality change request, and transmits a non-standard set up (hereinafter, "NSS") signal, a transmitting subscriber identification (hereinafter, "TSI") signal and a digital command signal (hereinafter, "DCS") to the receiving subscriber's facsimile system. Next, the receiving subscriber's facsimile system transmits a confirmation to receive (hereinafter, "CFR") signal to the transmitting subscriber's facsimile system. The transmitting subscriber's facsimile system transmits image data from a document to the receiving subscriber's facsimile system in response to the CFR signal. After one page of image data is transmitted, the transmitting subscriber's facsimile system transmits an end of page (hereinafter, "EOP") signal to the receiving subscriber's facsimile system. In response to the EOP signal, the receiving subscriber's facsimile system transmits a message confirmation (hereinafter, "MCF") signal to the transmitting subscriber's facsimile system, thus completing the transmission and reception of one page of image data. Then, in order to receive a next page of image data, the receiving subscriber's facsimile system again transmits the NSF, CSI and DIS signals to the transmitting subscriber's facsimile system to thereby repeat the previously described operations. The protocol for transmitting and receiving document images in this manner is prescribed in the Consultive Committee in International Telephone and Telegraph (hereinafter, "CCITT") recommendation. This protocol, and a protocol in accordance with a CCITT.41420 standard is performed through five phases as shown in Table <1>.

TABLE 1

| | TRANSMITTING SYSTEM | RECEIVING SYSTEM |
|---|---|---|
| PHASE A | CALLING(CNG) | CALLED STATION IDENTIFICATION(CED) |
| PHASE B | COMMAND INFORMATION (NSS + TSI + DCS) TRAINING (HIGH SPEED) (9600/7200/4800/2400) | CAPABILITIES IDENTIFICATION (NSF + CSI + DIS) CONFORMATION TO RECEIVE (CFR) |
| PHASE C | MESSAGE HIGH SPEED (9600/7200/4800/2400) | |
| PHASE D | END OF MESSAGE (EOP/MPS/EOM/RPI_Q) | CONFIRMATION TO RECEIVE (MCF/RTP/RTN/PIP/PIN) |
| PHASE E | DISCONNECT THE LINE (DCN) | |

As shown in Table <1>, in phase A, which is a call set-up phase, the transmitting and receiving systems exchange the CNG and CED signals. In phase B, which is a pre-message procedure phase, the transmitting and receiving systems exchange the NSS+TSI+DCS and NSF+CSI+DIS and CFR signals. Phase C is a phase for transmitting a facsimile message (image data). Phase D is a post-message procedure phase. In phase D, the transmitting and receiving systems exchange the EOP/MPS/EOM/RPI_Q and the MCF/RTP/RTN/PIP/PIN signals. In phase E, the transmitting system transmits a disconnection (hereinafter, "DCN") signal to the receiving system, and the call is released.

In the conventional facsimile system, however, if an error is generated or there is no response from a counterpart's facsimile system during transmission and reception of document data according to the previously described protocol, a message indicating that an error has occurred or that no response has occurred is displayed. If the error is generated during transmission of the document data, the error message is displayed and transmission is then terminated. At this time, if a user presses a re-dial key, the receiving subscriber's telephone number is re-dialed at a predetermined time interval, and communication is re-attempted as many times as is designated by the user.

In this conventional facsimile system, when an error is generated during communication, only the error message is displayed and transmission of the document data is terminated. Therefore, there is a disadvantage in that when an error is generated while transmitting several document pages, the user has to re-transmit all of the document pages, irrespective of whether some of the pages have been successfully transmitted, thereby wasting the user's time and incurring unnecessary telephone charges. The present invention is directed towards solving this problem.

SUMMARY OF THE INVENTION

Therefore, it is an object of the present invention to provide a method for transmitting remaining pages of a document when an error is generated during communication in a facsimile system.

It is another object to provide a method for transmitting remaining pages of a document by automatically re-dialing the receiving subscriber's telephone number when an error is generated during communication in a facsimile system.

It is still another object to provide a facsimile transmission method that eliminates the inconvenience of having to re-transmit pages of a document that have already been properly transmitted to a receiving subscriber.

It is yet another object to provide a facsimile transmission method that reduces telephone charges.

To achieve these and other objects, the present invention provides a method for transmitting a document when an error is generated during communication in a facsimile system. The method contemplates the steps of: determining whether the error is generated in a call setup phase during the communication performed in accordance with a predetermined protocol; automatically re-dialing a receiving subscriber's telephone number to transmit image data from the document, when the error is generated in the call setup phase; determining whether the error is generated during transmission of the image data from the document, when the error is not generated in the call setup phase; and automatically re-dialing the receiving subscriber's telephone number and beginning transmission at a next page of the document immediately following a page of the document that generated the error, when the error is generated during the transmission of the image data.

BRIEF DESCRIPTION OF THE DRAWINGS

A more complete appreciation of the invention, and many of the attendant advantages thereof, will be readily apparent as the same becomes better understood by reference to the following detail description when considered in conjunction with the accompanying drawings in which like reference symbols indicate the same or similar components, wherein.

DETAILED DESCRIPTION OF THE INVENTION

Figure 1:
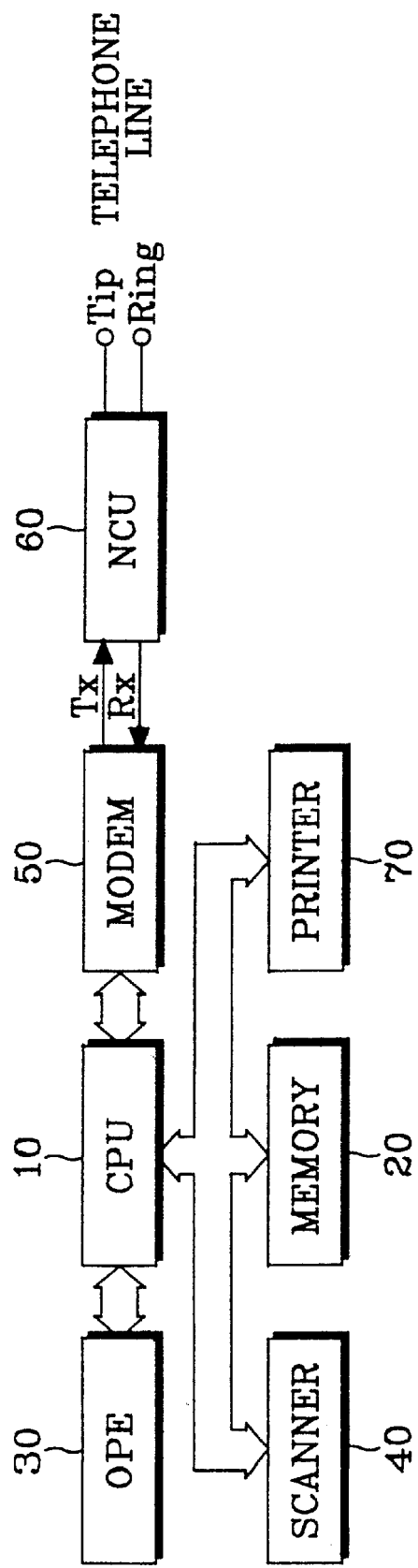
FIG. 1 is a block diagram illustrating the construction of the facsimile system constructed according to the principles of the present invention.

Turning now to the drawings and referring to FIG. 1, a block diagram illustrating the facsimile system constructed according to the principles of the present invention is shown. In FIG. 1, a central processing unit (hereinafter, "CPU") 10 controls the facsimile system according to a given program in order to re-transmit a document when an error is generated during communication. A memory 20 stores the program, including protocol data and character data, and accesses data under the control of CPU 10. An operating panel (hereinafter, "OPE") 30 includes a plurality of keys, such as a dial key, a density designation key, a resolution designation key and a function designation key, etc., for generating various key data, and further includes a display unit for displaying the data. A scanner 40 scans image data from a document for conversion into digital image data, and transmits the digital image data to CPU 10. A modulator-demodulator (hereinafter, "MODEM") 50 modulates data provided from CPU 10 to thereby output analog data, and simultaneously demodulates received analog data to thereby output digital data under the control of CPU 10. A network control unit (hereinafter, "NCU") 60 connects a speech loop of a telephone line, and interfaces signals between MODEM 20 and the telephone line under the control of CPU 10. A printer 70 prints received data according to a control signal provided from CPU 10.

Figure 2:
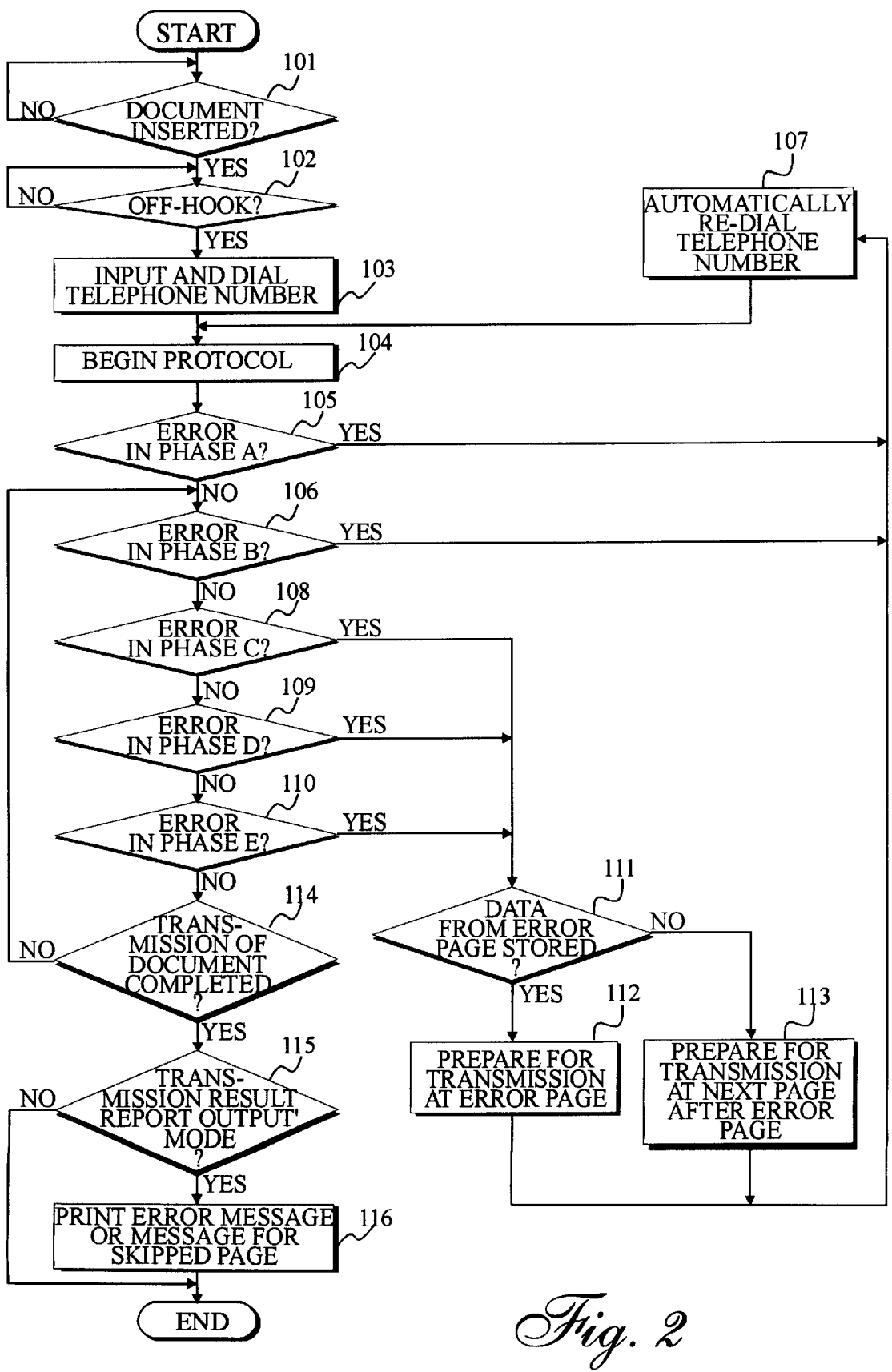
FIG. 2 is a flow chart illustrating a method for transmitting a document upon generation of an error during communication in a facsimile system according to the principles of the present invention.

FIG. 2 is a flow chart illustrating a method for transmitting a document upon generation of an error during communication in a facsimile system according to the principles of the present invention. Briefly, the method of FIG. 2 contemplates the steps of: determining whether or not an error is generated in phase A or B during communication in accordance with a predetermined protocol; automatically re-dialing a receiving subscriber's telephone number to thereby transmit document pages when an error is generated in phase A or B; determining whether or not an error is generated in phase C, D or E when an error is not generated in phase A or B; and automatically re-dialing the receiving subscriber's telephone number to thereby begin transmission at a next page following an error page when an error is generated in phase C, D or E.

With reference to FIGS. 1 and 2, the preferred embodiment of the present invention will now be described in detail.

The facsimile system of the present invention may be generally provided with two distinct document transmission methods. With the first method, after the document is inserted and the receiving subscriber's telephone number is dialed, the facsimile system scans all of the pages of the document to thereby store all of the scanned image data from the document in memory, and then performs the protocol, thereby transmitting the document data. With the second method, however, the facsimile system scans image data from the document according to the protocol, thereby transmitting the document data. When employing the first method, the facsimile system transmits document data after scanning image data from the document and storing all of the scanned image data in memory. Therefore, with the first method, the document page that generates an error, as well as the remaining document pages, can be transmitted. On the other hand, when employing the second method, the facsimile system transmits image data from the document according to the protocol. Therefore, with the second method, when an error is generated during communication, only the document pages remaining after the document page that generates the error can be transmitted.

With reference to FIG. 2, the operations of transmitting image data when an error is generated during communication in a facsimile system according to the present invention will be explained. In step 101, CPU 10 determines whether or not the document is inserted into the document feeding cassette, and if the document is inserted, proceeds to step 102. In step 102, CPU 10 determines whether or not the system is in an off-hook state, and if the system is in an off-hook state, proceeds to step 103. In step 103, CPU 10 receives the telephone number of a receiving subscriber through OPE 30, and dials the received telephone number. Then, in step 104, CPU 10 begins performance of the protocol previously described in Table 1 to thereby transmit image data from the document to the receiving subscriber's facsimile system. During performance of the protocol, CPU 10 determines whether an error is generated in phase A, in step 105. If no error is generated in phase A, CPU 10 proceeds to step 106 to determine whether an error is generated in phase B. If an error is generated in either phase A or phase B, CPU 10 proceeds to step 107 and performs an automatic re-dialing operation, thereby transmitting the document from the beginning. That is, all of the pages of the document are transmitted.

Next, during continued performance of the document transmission protocol, CPU 10 determines whether an error is generated in phase C, D or E, in steps 108 through 110, respectively. If an error is generated in phase C, D or E, CPU 10 proceeds to step 111 to thereby determine whether or not image data from the document page that generates the error is stored in memory 20. If the image data from the document page generating the error is stored in memory 20, CPU 10 proceeds to step 112 and prepares for transmission of the document beginning at, and including, the page that generated the error, and then proceeds to step 107. In step 107, CPU 10 automatically re-dials the receiving subscriber's telephone number. CPU 10 then proceeds back to step 104 to transmit the remaining document pages, including the page that generated the error (i.e., error page). On the other hand, if in step 111, image data from the document page generating the error has not been stored, CPU 10 proceeds to step 113 and prepares for transmission of the document beginning at the next document page immediately following the document page that generated the error, and then returns to step 107. In step 107, CPU 10 automatically re-dials the receiving subscriber's telephone number. CPU 10 then proceeds back to step 104 to transmit the document pages remaining after the page that generated the error. That is, in the situation where image data of the scanned document is transmitted according to the protocol without being stored in memory 20, if an error is generated in steps 108 through 110, CPU 10 prepares for transmission of the document beginning at the next document page following the document page that generated the error, and then proceeds to step 107.

In step 114, CPU 10 determines whether or not transmission of the document is completed, and if not completed, repeatedly performs steps 106 through 110. Alternatively, if transmission of the document is completed, CPU 10 proceeds to step 115 to thereby determine whether or not a transmission result report output mode is designated, and if the mode is designated, proceeds to step 116. In step 116, CPU 10 controls printer 70 to print an error message or a message indicating that a document page (i.e., error page) has been skipped in the transmission process, and then terminates the program.

As previously discussed, if an error is generated while transmitting document pages according to the previously described protocol, the facsimile system of the present invention automatically re-dials the receiving subscriber's telephone number to thereby continue transmission of the document until the communication is finished. Accordingly, when an error is generated during communication, the user does not need to re-transmit the document pages which have already been transmitted. As a result, the present invention provides advantages in that it is capable of preventing unnecessary telephones charges, and also saves the time that is wasted when document pages are re-transmitted.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method for transmitting a document when an error is generated during communication in a facsimile system, said method comprising the steps of:

determining whether the error is generated in a call setup phase during communication performed in accordance with a predetermined protocol;

automatically re-dialing a receiving subscriber's telephone number and transmitting image data from a starting point of the document when the error is generated in said call setup phase;

determining whether the error is generated during transmission of the image data from the document when the error is not generated in said call setup phase; and automatically re-dialing the receiving subscriber's telephone number and beginning transmission at a next page of the document immediately following a page of the document that generates the error when the error is generated during the transmission of the image data.

2. The method as claimed in claim 1, further comprised of printing a message indicating that the page of the document that generates the error has not been transmitted after transmission of the image data is terminated.

3. A method for transmitting a document when an error is generated during communication in a facsimile system, said method comprising the steps of:

determining whether the error is generated in one of a first phase and a second phase of a transmission protocol during the communication;

automatically re-dialing a receiving subscriber's telephone number and transmitting the document from a starting point thereof when the error is generated in one of said first phase and said second phase;

determining whether the error is generated in one of a third phase, a fourth phase and a fifth phase of said transmission protocol when the error is not generated in one of said first phase and said second phase; and automatically re-dialing said receiving subscriber's telephone number and beginning transmission at a next page of the document immediately following a page of the document that generates the error when the error is generated during one of said third phase, said fourth phase and said fifth phase.

4. The method as claimed in claim 3, further comprised of printing a message indicating that the page of the document that generates the error has not been transmitted after transmission of the document is terminated.

5. A method for transmitting a document when an error is generated during communication in a facsimile system, said method comprising the steps of:

determining whether the error is generated in a call setup phase during communication performed in accordance with a predetermined protocol;

automatically re-dialing a receiving subscriber's telephone number and transmitting image data from a starting point of the document when the error is generated in said call setup phase;

determining whether the error is generated during transmission of the image data from the document when the error is not generated in said call setup phase;

determining whether the image data from a page of the document that generates the error is stored when the error is generated during the transmission of the image data; and automatically re-dialing said receiving subscriber's telephone number and beginning transmission at the page of the document that generates the error when the image data from the page of the document that generates the error is stored.

6. The method as claimed in claim 5, further comprised of automatically re-dialing said receiving subscriber's telephone number and beginning transmission at a next page of the document immediately following the page of the document that generates the error when the image data from the page of the document that generates the error is not stored.

7. The method as claimed in claim 6, further comprised of printing a message indicating that the page of the document that generates the error has not been transmitted after transmission of the document is terminated when the image data from the page of the document that generates the error is not stored.

8. A method for transmitting a document when an error is generated during communication in a facsimile system, said method comprising the steps of:

determining whether the error is generated in one of a first phase and a second phase of a transmission protocol during the communication;

automatically re-dialing a receiving subscriber's telephone number and transmitting the document from a starting point thereof when the error is generated in one of said first phase and said second phase;

determining whether the error is generated in one of a third phase, a fourth phase and a fifth phase of said transmission protocol when the error is not generated in one of said first phase and said second phase;

determining whether image data from a page of the document that generates the error is stored when the error is generated during one of said third phase, said fourth phase and said fifth phase; and automatically re-dialing said receiving subscriber's telephone number and beginning transmission at the page of the document that generates the error when the image data from the page of the document that generates the error is stored.

9. The method as claimed in claim 8, further comprised of automatically re-dialing said receiving subscriber's telephone number and beginning transmission at a next page of the document immediately following the page of the document that generates the error when the image data from the page of the document that generates the error is not stored.

10. The method as claimed in claim 9, further comprised of printing a message indicating that the page of the document that generates the error has not been transmitted after transmission of the document is terminated when the image data from the page of the document that generates the error is not stored.

11. A facsimile system, comprising:

scanning means for scanning image data from a document to be transmitted;

memory means for storing the image data from the document; and control means for determining whether an error is generated in a call setup phase during communication performed in accordance with a predetermined protocol;

wherein said control means automatically re-dials a receiving subscriber's telephone number and transmits the image data from the document when the error is generated in said call setup phase;

wherein said control means determines whether the error is generated during transmission of the image data from the document when the error is not generated in said call setup phase;

wherein said control means determines whether the image data from a page of the document that generates the error is stored in said memory means when the error is generated during the transmission of the image data; and wherein said control means automatically re-dials said receiving subscriber's telephone number and begins transmission at the page of the document that generates the error when the image data from the page of the document that generates the error is stored in said memory means.

12. The facsimile system as claimed in claim 11, wherein said control means automatically re-dials said receiving subscriber's telephone number and begins transmission at a next page of the document immediately following the page of the document that generates the error when the image data from the page of the document that generates the error is not stored in said memory means.

13. The facsimile system as claimed in claim 12, further comprising printing means for printing a message indicating that the page of the document that generates the error has not been transmitted after transmission of the document is terminated when the image data from the page of the document that generates the error is not stored in said memory means.

* * * * *